(12) United States Patent
Kanazawa

(10) Patent No.: US 7,179,990 B2
(45) Date of Patent: Feb. 20, 2007

(54) ELECTRIC JUNCTION BOX

(75) Inventor: Masashi Kanazawa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 11/152,241

(22) Filed: Jun. 15, 2005

(65) Prior Publication Data
US 2006/0021779 A1 Feb. 2, 2006

(30) Foreign Application Priority Data
Jul. 31, 2004 (JP) ............................. 2004-247559

(51) Int. Cl.
H02G 3/08 (2006.01)

(52) U.S. Cl. ..................... 174/50; 174/60; 174/61; 174/59; 174/520; 439/76.2

(58) Field of Classification Search .................. 174/50, 174/60, 61, 59, 520, 58; 220/3.2, 4.02; 439/76.2, 439/723, 76.1, 724, 212, 949
See application file for complete search history.

(56) References Cited

U.S. PATENT DOCUMENTS

| 5,645,448 | A | | 7/1997 | Hill |
| 5,967,819 | A | * | 10/1999 | Okada ........................ 439/212 |
| 6,787,698 | B2 | * | 9/2004 | Higuchi et al. ................ 174/50 |
| 6,800,807 | B2 | * | 10/2004 | Ishiguro et al. ............... 174/50 |
| 6,969,285 | B2 | * | 11/2005 | Kobayashi .................. 439/723 |
| 7,053,298 | B2 | * | 5/2006 | Ikeda et al. .................... 174/50 |
| 2004/0008503 | A1 | | 1/2004 | Higuchi et al. |

FOREIGN PATENT DOCUMENTS

| EP | 1 310 972 A1 | 5/2003 |
| EP | 1 482 530 A1 | 12/2004 |

* cited by examiner

*Primary Examiner*—Dhiru R. Patel
(74) *Attorney, Agent, or Firm*—Oliff & Berridge, PLC

(57) ABSTRACT

An electric junction box, disposed in a water penetration region, which accommodates bus bars inside a case body thereof and has fuses (fusible links connected with the bus bars. An upper cover and a lower cover are mounted on the case body 11 with the case body, the upper cover, and the lower cover connected with one another. An entire peripheral wall of the upper cover is formed not as a double-wall construction, but an inner peripheral surface of the peripheral wall is brought into contact with an outer surface of an entire peripheral wall of the lower cover (or case body) to lock the peripheral wall and the entire peripheral wall of the lower cove to each other. In a watertight region including at least the fuses, a rib is projected in the shape of a frame from an inner surface of an upper wall of the upper cover so that the rib surrounds the watertight region.

5 Claims, 8 Drawing Sheets

ELECTRIC JUNCTION BOX

BACKGROUND

1. Field of the Invention

The present invention relates to an electric junction box. More particularly the present invention is intended to make the electric junction box compact by improving a watertight construction thereof.

2. Description of the Related Art

As the conventional watertight construction of the electric junction box mounted on vehicles and the like, the construction shown in Japanese Patent Application Laid-Open No. 9-308053 (patent document 1) is known. More specifically, as shown in FIG. 12, the electric junction box 1 includes a case body 2 in which the bus bar 6 and the fuse 7 are mounted, the upper cover 3 mounted on the upper surface of the case body 2 to cover the upper surface thereof, and a lower cover 4 mounted on the lower surface of the case body 2 to cover the lower surface thereof. The case body 2 and the upper cover 3 are locked to each other with a locking portion 5a. The case body 2 and the lower cover 4 are locked to each other with a locking portion 5b. The rib 3b is formed along the inner surface of the entire peripheral wall 3a of the upper cover 3 to form the electric junction box 1 as a double-wall construction, and the peripheral wall 2a of the case body 2 is fitted between the peripheral wall 3a and the rib 3b to thereby construct the entire electric junction box 1 to have a watertight construction.

In the above-described construction, the double-wall construction is formed along the entire peripheral wall 3a of the upper cover 3. Thus a large space is required to form the rib 3b, which causes the electric junction box 1 to have a large outer configuration. This construction is unfit for the demand for miniaturization of the electric junction box and causes the layout to be bad. The outermost peripheral part of the electric junction box 1 constructs the watertight construction thereof. Thus the watertight performance is readily influenced by the configuration of the electric junction box 1. If the electric junction box 1 has a long side, the peripheral wall of the long side and the rib are liable to warp and shrink. Thus it is difficult for the electric junction box 1 to display constant performance and allow a particular region inside the electric junction box 1 to secure high watertight performance.

Patent document 1: Japanese Patent Application Laid-Open No. 9-308053

SUMMARY OF THE INVENTION

The present invention has been made in view of the above-described problem. Accordingly, it is an object of the present invention to provide an electric junction box which is capable of complying with a demand for miniaturization thereof and has stable and high watertight performance.

To achieve the object, the present invention provides an electric junction box, disposed in a water penetration region, which accommodates a bus bar in a case body thereof and has a fuse connected with the bus bar in the case body connected with an upper cover and a lower cover, with the upper cover and the lower cover mounted on upper and lower surfaces of the case body respectively. In this construction, an entire peripheral wall of the upper cover is not constructed as a double-wall construction, but is locked to a peripheral wall of the lower cover or a peripheral wall of the case body; and in a watertight region including at least the fuse, a rib is projected in the shape of a frame from an inner surface of an upper wall of the upper cover to surround the watertight region.

That is, to prevent the fuse from being corroded, it is necessary to waterproof the fuse to a higher extent than other portions inside the electric junction box. Needless to say, it is favorable that other portions are not exposed to water. But there is no problem so long as the electric junction box is securely drained. Therefore the entire electric junction box does not necessarily have to be waterproofed. It is necessary to form the rib in only the watertight region including the fuse. Thereby unlike the conventional construction in which the rib is formed along the entire peripheral wall of the upper cover, the construction of the present invention allows the space for the rib to be reduced. Consequently it is possible to effectively utilize a wide space inside the electric junction box as a space for wiring the bus bar and hence make the electric junction box compact.

Further by forming the rib for watertight use on the periphery of the watertight region, the watertight performance of the rib is not affected adversely by the configuration of the entire electric junction box. Thus the watertight region has constant watertight performance and secures high watertight performance.

Further the present invention provides an electric junction box, disposed in a water penetration region, which accommodates a bus bar in a case body thereof and has a fuse connected with the bus bar in the case body connected with an upper cover and a lower cover, with the upper cover and the lower cover mounted on upper and lower surfaces of the case body respectively. In this construction, a rib is projected from an inner surface of an upper wall of the upper cover by disposing the rib at a side of a fuse-including watertight region confronting a peripheral wall of the upper cover; and the lower cover or a peripheral wall of the case body is fitted in a space between the rib and the peripheral wall of the upper cover to form a waterproof wall; and inside a portion of the upper cover in which the waterproof wall is not formed, a watertight bent portion is formed on the bus bar connected with the fuse so that the watertight region is surrounded with the watertight bent portion and the waterproof wall.

More specifically, in the peripheral portion surrounding the watertight region including at least the fuse, the rib is projected from the inner surface of the upper wall of the upper cover in only the peripheral portion at the side thereof which confronts the peripheral wall of the upper cover and does not have members disposed between the peripheral wall of the upper cover and the watertight region or does not require a wide space (for example, bus bar vertically disposed) in a horizontal direction even though members are disposed. The rib is formed by spacing the rib at a required space from the peripheral wall of the upper cover to fit the lower cover or the peripheral wall of the case body in the space. When the upper cover, the lower cover, and the case body are connected with each other, with the upper cover and the lower cover placed on the upper and lower surfaces of the case body respectively, the lower cover or the peripheral wall of the case body is fitted between the peripheral wall of the upper cover and the rib to form the waterproof wall.

In the peripheral portion surrounding the watertight region, it is impossible to form the waterproof wall in which the lower cover or the peripheral wall of the case body is fitted between the peripheral wall of the upper cover and the rib in the inner side of the upper cover, namely, in the peripheral portion at the side thereof which is distant from the peripheral wall of the upper cover and accommodates a member such as the bus bar disposed between the peripheral wall of the upper cover and the watertight region. Therefore in the peripheral portion of the watertight region, the rib is not formed but instead the wall shaped watertight bent portion formed by bending the bus bars is disposed.

The watertight region is surrounded with not only the rib projected from the upper cover, but also the watertight bent portion consisting of the bus bar. Thereby it is possible to further reduce the rib-forming space and make the electric junction box more compact.

The fuse consists of a fusible link; a region in which the one fusible link or a plurality of fusible links arranged adjacently is disposed is formed as the watertight region; and the bus bars connected with input terminals of the fusible links respectively are connected with a battery terminal. The electric junction box is composed of a fuse box mounted on a battery box.

A bolt is projected from a portion where the bus bars and the fusible links are connected with each other respectively and is spaced at a predetermined interval from a bottom wall of the case body; the bolt is inserted into input and output terminals of the fusible links to fix the fusible links with a nut; the fusible links are spaced at a predetermined interval from the bottom wall of the case body; and a drain hole is formed in penetration through the bottom wall of the case body at which a lower portion of the fusible links is disposed.

Because the fusible links and the bus bars connected therewith are disposed at positions higher than the bottom wall of the case body, it is possible to drain water efficiently from the drain hole even when the water penetrates into the fuse box and prevent the fusible links and the bus bars from being exposed to the water. Further because the fuse box is mounted on the battery box, there is no fear that the water penetrates into the fuse box from the drain hole.

As apparent from the foregoing description, according to the construction of the present invention, compared with the construction in which the rib is formed along the entire peripheral wall of the upper cover, the frame-shaped rib is formed on the periphery of the watertight region. Therefore the space in which the rib is formed is allowed to be small. Thereby a space provided by reducing the rib-forming space can be utilized to wire the bus bar and the like. Thus it is possible to make the electric junction box compact. Further by surrounding the watertight region with the watertight bent portion formed with the bus bar instead of the rib, it is possible to reduce the rib-forming space.

Because the rib is formed on the periphery of the watertight region, the watertight performance of the rib is not affected adversely by the configuration of the entire electric junction box. Thus the watertight region has constant and reliable watertight performance.

DETAILED DESCRIPTION OF THE PREFERRED EMBODIMENTS

Figure 1:
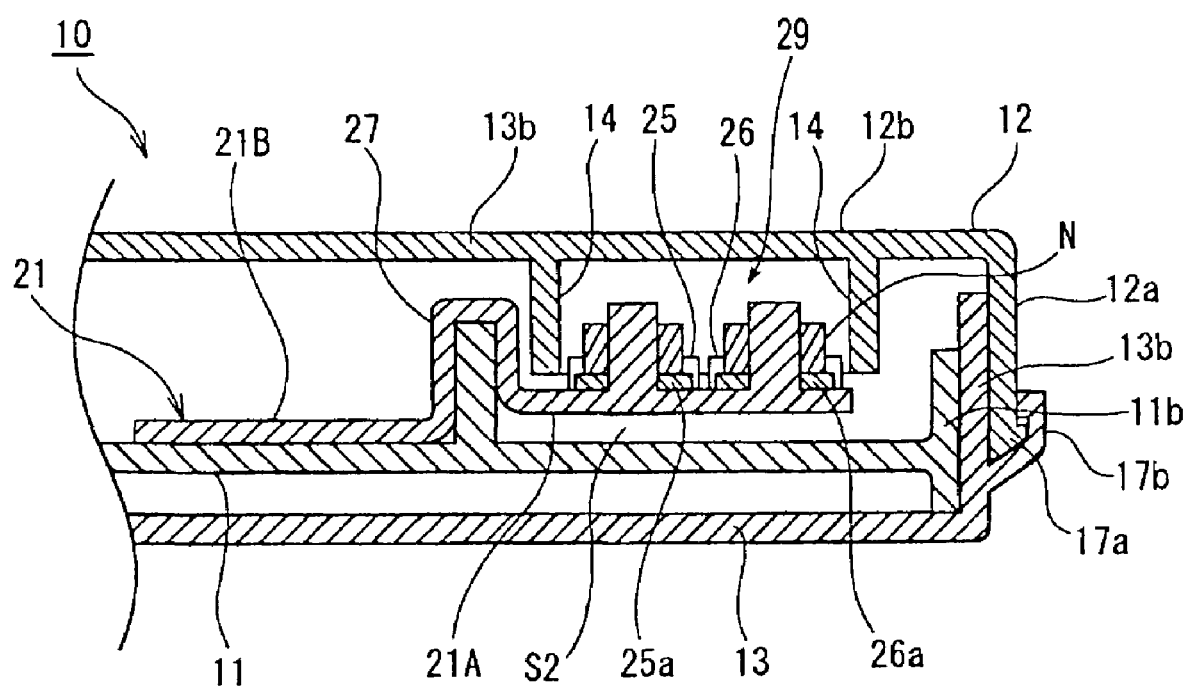
FIG. 1 is a sectional view of an electric junction box according to a first embodiment of the present invention.

The embodiments of the present invention will be described below with reference to drawings. The present invention is applied to an electric junction box composed of a fuse box disposed in a water penetration region of an engine room of a vehicle.

FIGS. 1 through 7 show an electric junction box 10 of the first embodiment of the present invention. The electric junction box 10 has a case body 11; a plurality of bus bars 21, 22, and 23 provided on the case body 11; fusible links 25, 26 connected with the bus bars 21, 22, and 23; and an upper cover 12 and a lower cover 13 mounted on the case body 11 to cover the upper and lower surfaces thereof, with the case body 11, the upper cover 12, and the lower cover 13 connected with one another. The electric junction box 10 is mounted on a battery box 40.

Figure 2:
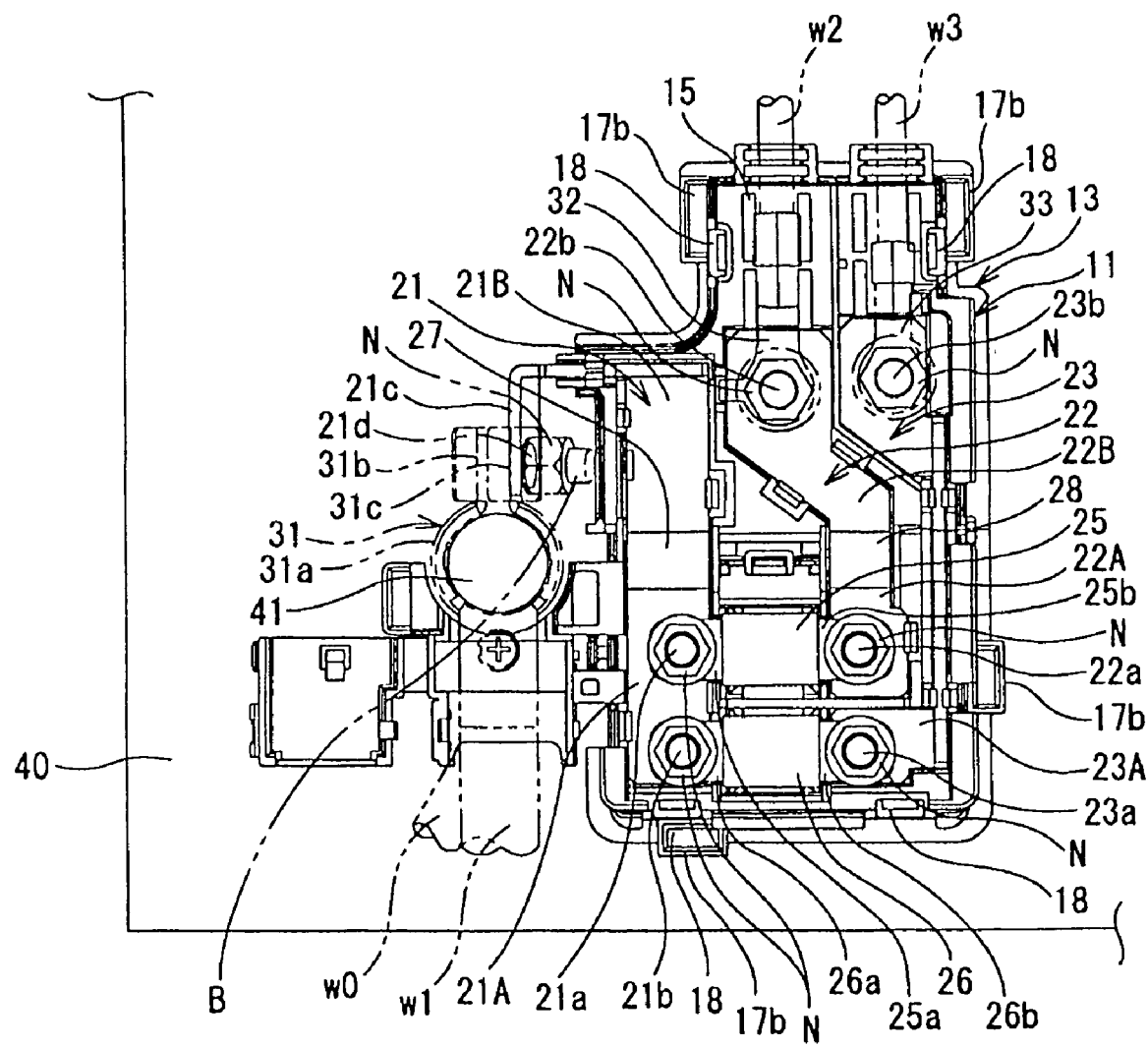
FIG. 2 is a plan view showing the inside of the electric junction box shown in FIG. 1.

More specifically, as shown in FIG. 2, one input side bus bar 21 and two output-side bus bar 22, 23 are disposed on an upper surface of the case body 11. An input terminal 25a of the fusible link 25 and an input terminal 26a of the fusible link 26 are fitted on bolts 21a, 21b respectively projected from one side of the input-side bus bar 21 and fastened to the bolts 21a, 21b with nuts N respectively. An output terminal 25b of the fusible link 25 is fitted on a bolt 22a disposed at one side of the output side bus bar 22 and fastened thereto with the nut N. An output terminal 26b of the fusible link 26 is fitted on a bolt 23a disposed at one side of the output-side bus bar 23 and fastened thereto with the nut N.

Figure 5A:
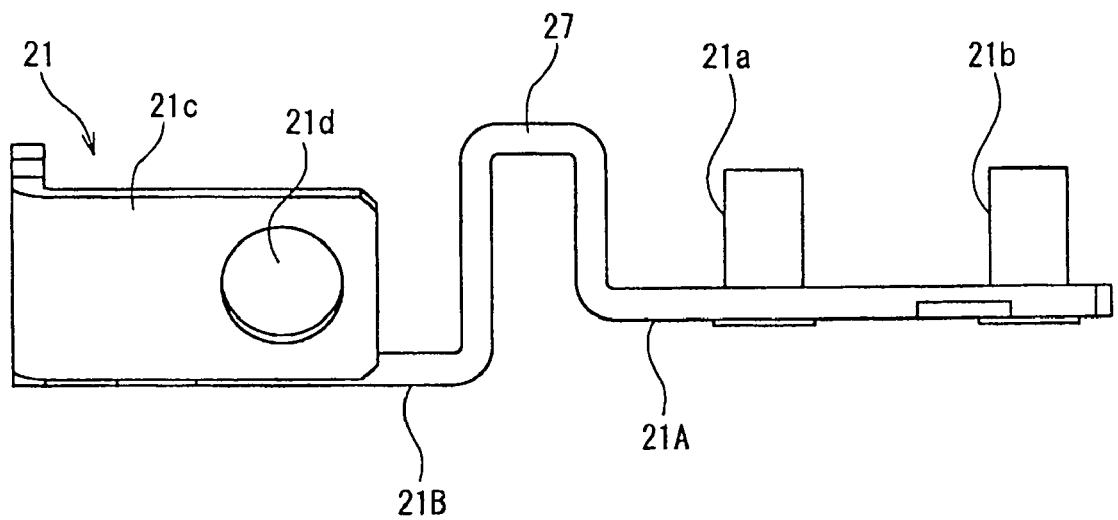
FIG. 5A is a side view showing an input side bus bar.

The other side of the input-side bus bar 21 is bent as shown in FIGS. 2 and 5A to form a connection piece 21c to be connected to a battery terminal 31 of a battery terminal. The battery terminal 31 is crimped to an electric wire w1 connected to a starter and to an electric wire w0 connected with a relay box. The battery terminal 31 has a circular-arc portion 31a at a distal end thereof and a pair of tightening pieces 31b, 31c projected from the circular-arc portion 31a. A bolt hole 21d communicating with a bolt hole (not shown) formed on the tightening pieces 31b, 31c is formed on the connection piece 21c of the input side bus bar 21.

Figure 5B:
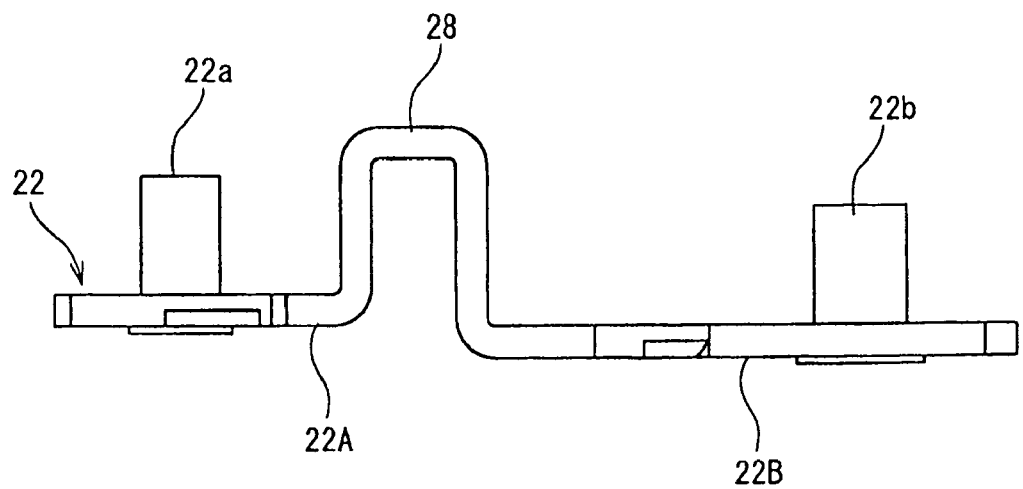
FIG. 5B is a side view showing an output side bus bar.

As shown in FIG. 5B, a bolt 22b is projected from the other side of the output-side bus bar 22. As shown in FIG. 2, a perforated terminal 32 crimped to an output electric wire w2 is fitted on the bolt 22b and fastened thereto with the nut N. Similarly a bolt 23b is projected from the other side of the output-side bus bar 22. A perforated terminal 33 crimped to an output electric wire w3 is fitted on the bolt 23b and fastened thereto with the nut N.

As shown in FIG. 5A, the input-side bus bar 21 is bent upward at a position thereof disposed at an inner side of the case body 11 with respect to the bolts 21a, 21b connected with the fusible links 25, 26 respectively. Thereby a watertight bent portion 27 is formed. The input-side bus bar 21 is so designed that a horizontal portion 21A disposed at a fuse side with respect to the watertight bent portion 27 is at a higher position than a horizontal portion 21B disposed at a non-fuse side.

Similarly as shown in FIG. 5B, the output side bus bar 22 is bent upward at a position thereof disposed at an innerside of the case body 11 with respect to the bolt 22a connected with the fusible links 25. Thereby a watertight bent portion 28 is formed. The output-side bus bar 22 is so designed that a horizontal portion 22A disposed at a fuse side with respect to the watertight bent portion 27 is at a higher position than a horizontal portion 22B disposed at a non-fuse side.

Figure 6:
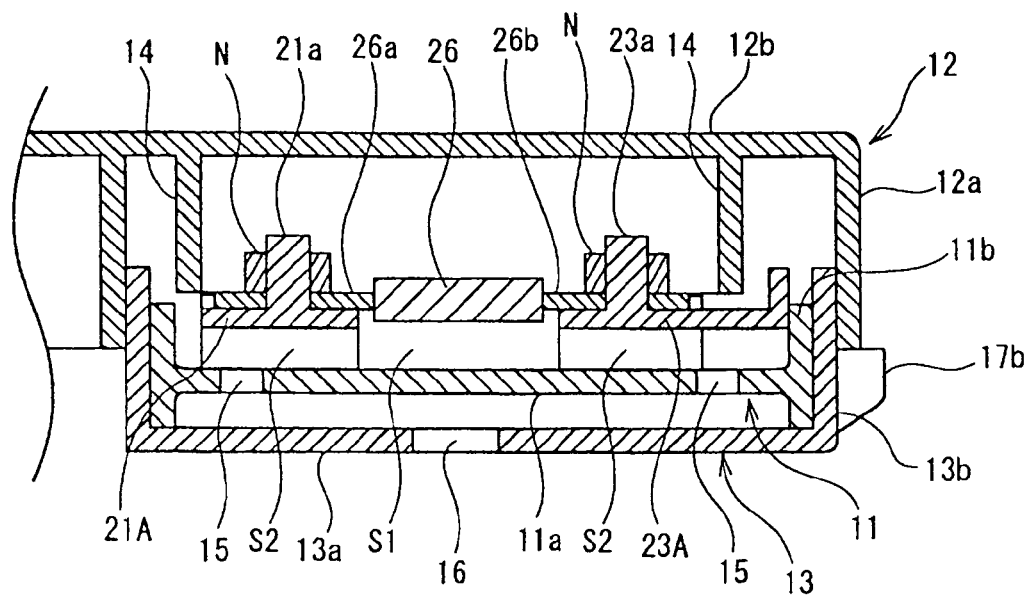
FIG. 6 is a sectional view showing a state in which a fusible link of a case body and a bus bar shown in FIG. 2 are mounted.

As shown in FIG. 6, a horizontal portion 23A, of the output side bus bar 23, on which the bolt 23a connected with the fusible link 26 and the horizontal portion 21A of the input-side bus bar 21 are on the same level by locating the horizontal portion 23A at a position higher than a bottom wall 11a of the case body 11.

Figure 3:
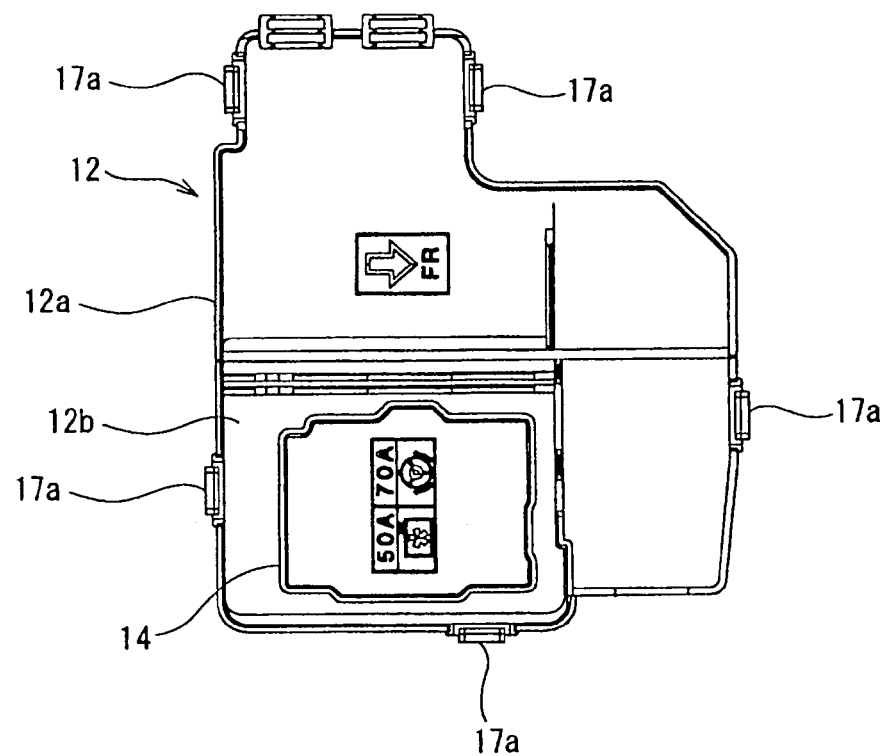
FIG. 3 is a plan view showing the inside of an upper cover.

As shown in FIG. 3, in the upper cover 12, an entire peripheral wall 12a is formed not as a double wall construction. A frame shaped rib 14 is projected from an inner surface of an upper wall 12b of the upper cover 12 at positions corresponding to the fusible links 25, 26 mounted on the case body 11 in such a way that the rib 14 surrounds the fusible links 25, 26 restrictedly.

Figure 4:
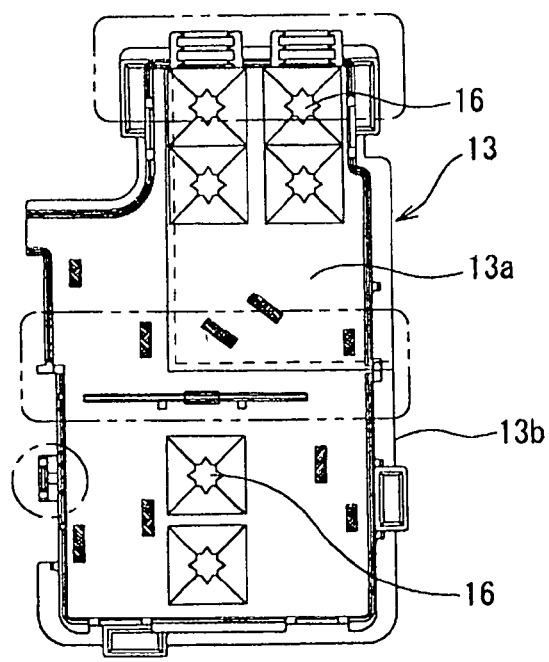
FIG. 4 is a plan view showing the inside of a lower cover.

As shown in FIG. 6, a drain hole 15 is formed in penetration through the bottom wall 11a of the case body 11. More specifically, the drain holes 15 are formed in the vicinity of a lead out port of output electric wires w2, w3 and in the vicinity of positions where the fusible links 25, 26 and the bus bars 21, 22, and 23 are connected with each other. As shown in FIG. 4, in penetration through a bottom wall 13a of the lower cover 13, two drain holes 16 are formed at the fuse side with respect to the position where the watertight bent portions 27, 28 are disposed and four drain holes 16 at the non-fuse side with respect to the position where the watertight bent portions 27, 28 are disposed. In total six drain holes 16 are formed.

The method of fixing the electric junction box 10 onto the battery box 40 is described below.

Initially the lower cover 13 is placed on a lower surface of the case body 11. Thereafter as shown in FIG. 2, the case body 11 and the lower cover 13 are connected to each other at a locking portion 18.

Thereafter as shown in FIG. 2, the circular arc portion 31a of the battery terminal 31 is fitted on the battery post 41 projected upward from the battery box 40. A bolt hole of each of the tightening pieces 31b, 31c and the bolt hole 21d of the connection piece 21 of the input-side bus bar 21 are overlapped on each other. After a bolt B is inserted into the bolt holes, the nut N is tightened to fixedly fit the circular-arc portion 31a on the battery post 41 so that the battery and the fusible links 25, 26 are electrically connected with each other and the electric junction box 10 is fixed to the upper surface of the battery box 40.

Finally, the upper cover 12 is placed on the upper surface of the case body 11. Thereafter a locking portion 17a of the upper cover 12 and a to-be-locked portion 17b of the lower cover 13 are locked to each other. At this time, an inner surface of the entire peripheral wall 12a of the upper cover 12 and an outersurface of an entire peripheral wall 13b of the lower cover 13 are in contact with each other.

In the electric junction box having the abovedescribed construction, the positions where the fusible links 25, 26 are disposed are set as a watertight region, and the rib 14 projected from the upper wall 12b of the upper cover 12 is formed in a narrow range, with the rib 14 surrounding the watertight region. Accordingly compared with the conventional construction of the watertight construction in which the rib is formed along the entire peripheral wall of the upper cover, the space in which the rib 14 is formed is small. Thereby a wide space in the electric junction box 10 can be utilized for wiring. Further the watertight performance of the rib 14 is not affected by the configuration of the electric junction box 10. Therefore the electric junction box 10 is capable of having constant performance. The rib 14 is disposed in proximity to the fusible links 25, 26, and the watertight bent portions 27, 28 are defined outside the rib 14 by the bus bars 21, 22. Therefore the watertight performance can be enhanced to a high extent.

By mounting the electric junction box 10 on the battery box 40, it is possible to prevent penetration of water into the electric junction box 10 from the lower surface of the electric junction box 10 through the drain holes 15, 16. The water that penetrates into the electric junction box 10 can be rapidly drained through the drain holes 15, 16 formed on the bottom wall 11a of the case body 11 and the bottom wall 13a of the lower cover 13, even when the water penetrates into the electric junction box 10 from the portion of the connection between the upper cover 12 and the case body 11 and between the lower cover 13 and the case body 11. As shown in FIG. 6, the fusible links 25, 26 are disposed at a high position spaced by a gap S1 from the bottom wall 11a of the case body 11 to prevent the penetration of the water. Further the fuse-side horizontal portion 21A of the input-side bus bar 21 and the fuse-side horizontal portions 22A, 23A of the outputside bus bar 22, 23 are spaced at a gap S2 from the bottom wall 11a of the case body 11. Therefore the watertight region can be drained efficiently and rapidly.

Figure 7:
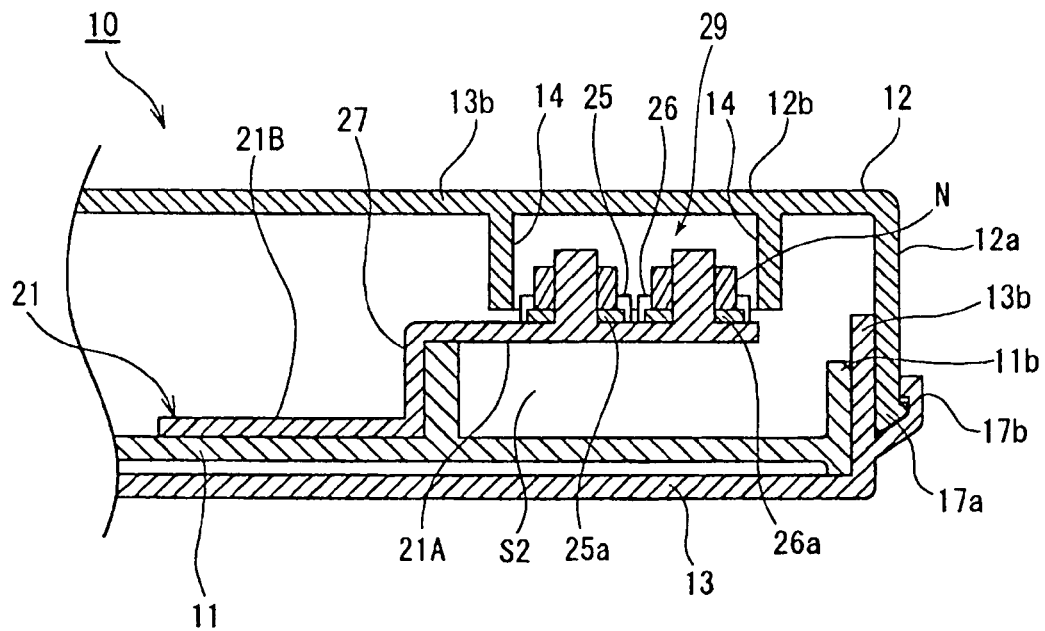
FIG. 7 shows a modification of the first jjj.

FIG. 7 shows a modification of the first jjj. The watertight bent portions 27, 28 are provided on the bus bars 21, 22 respectively. The side of the bus bars 21, 22 at which the fusible links are disposed is not located at positions lower than the upper end of the watertight bent portions 27, 28 unlike the first jjj, but is disposed on a level with the upper end of the watertight bent portions 27, 28. That is, the side of the watertight bent portions 27, 28 at which the fusible links are disposed is not bent downward but is extended horizontally.

In the above-described construction, the sufficient gap S2 can be provided between the bus bars 21, 22 and the case body 11. Thus it is possible to prevent water penetration through the fusible links 25, 26.

Figure 8:
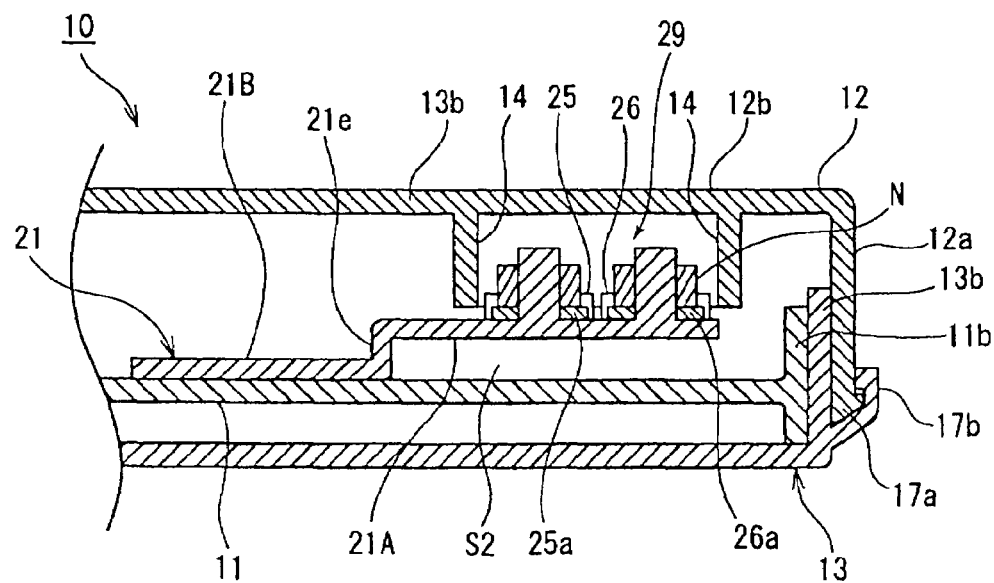
FIG. 8 is a sectional view of an electric junction box according to a second embodiment of the present invention.
Figure 9:
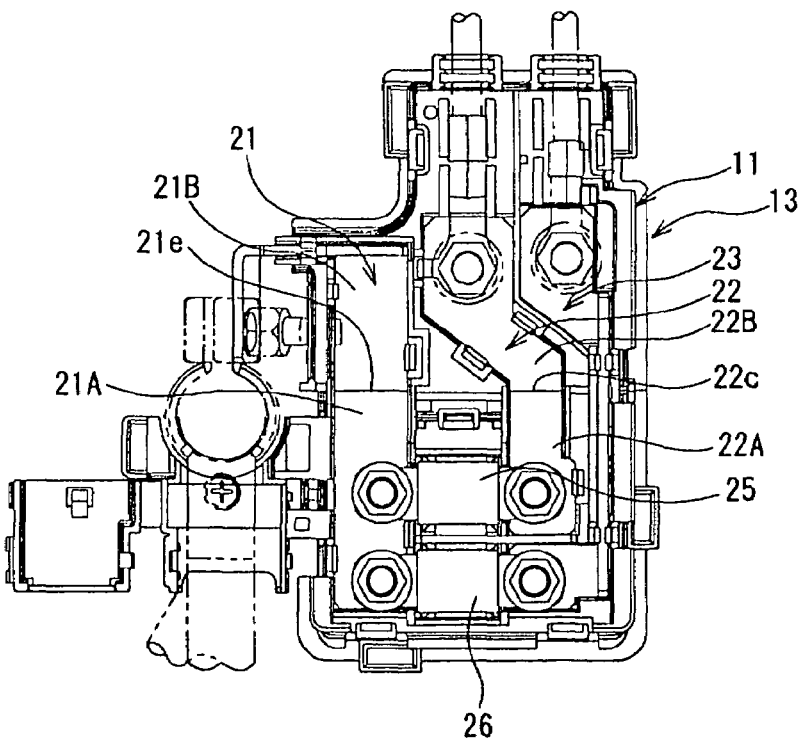
FIG. 9 is a plan view showing the inside of the electric junction box shown in FIG. 8.

FIGS. 8 and 9 show the second embodiment of the present invention. The second embodiment is different from the first embodiment in that the watertight bent portions 27, 28 are not formed on the input-side bus bar 21 and the output-side bus bar 22 respectively and that only the rib 14 formed on the upper cover 12 surrounds the watertight region. In other points, the second embodiment has the same construction as that of the first embodiment. Thus the same parts of the second embodiment as those of the first embodiment are denoted by the sane reference numerals as those of the first embodiment, and description thereof is omitted herein.

More specifically, the watertight bent portions 27, 28 are not formed on the input-side bus bar 21 and the output-side bus bar 22 respectively. Stepped potions 21e, 22c are formed on the input-side bus bar 21 and the output-side bus bar 22, and the fuse-side horizontal portions 21A, 22A are disposed at positions higher than the bottom wall 11a of the case body 11 by a gap S2.

This construction eliminates the need for forming the watertight bent portions 27, 28 on the bus bars 21, 22. Therefore it is possible to utilize the space effectively to a higher extent and make the electric junction box compact.

Figure 10:
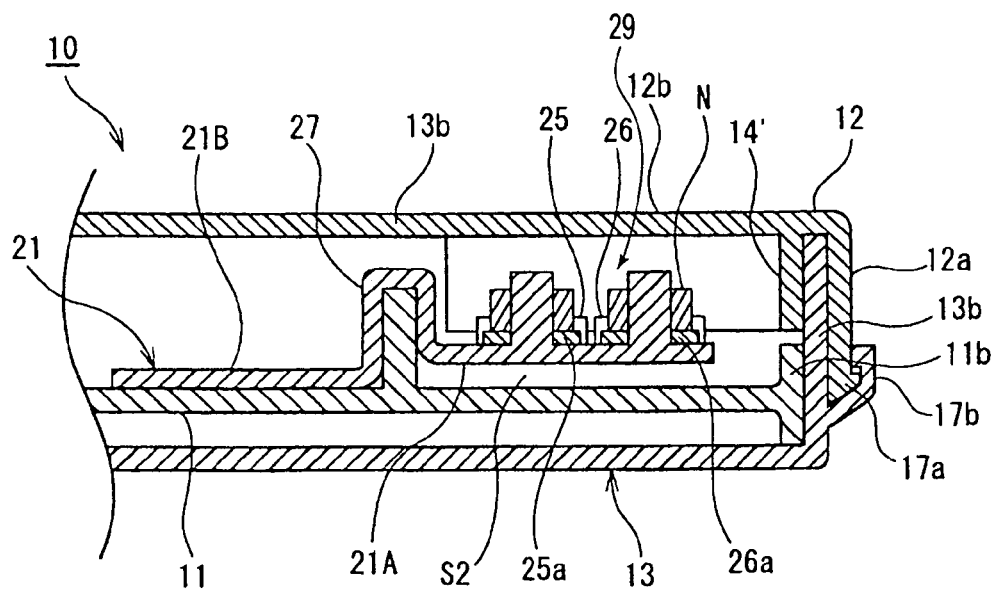
FIG. 10 is a sectional view of an electric junction box according to a third embodiment of the present invention.
Figure 11:
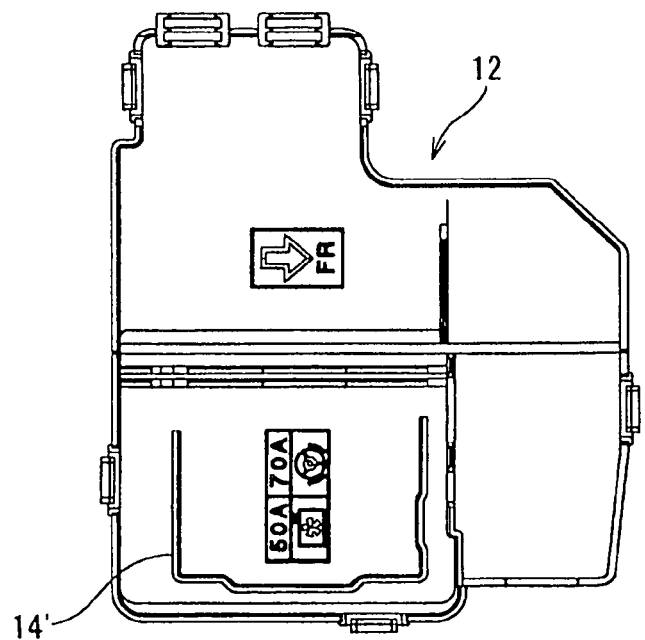
FIG. 11 is a plan view showing the inside of an upper cover of the electric junction box shown in FIG. 10.
Figure 12:
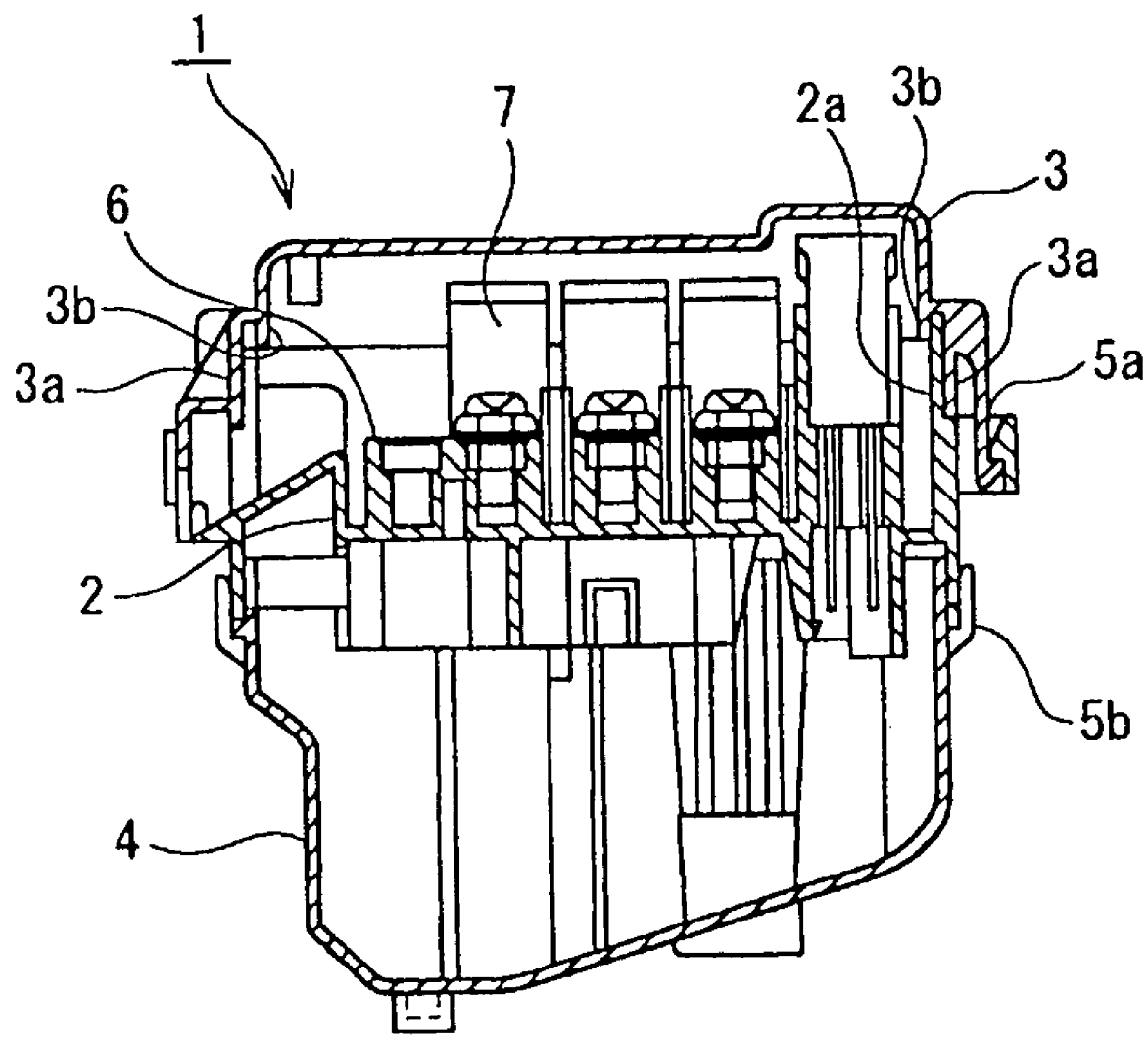
FIG. 12 shows a conventional art.

FIGS. 10 and 11 show the third embodiment of the present invention. The third embodiment is different from the first embodiment in that a U-shaped rib 14' is formed at a position of the upper cover 12 confronting the peripheral wall 12a of the upper cover 12 along the peripheral wall 12a of the upper cover 12 so that the peripheral 12a and the rib 14' form a double-wall construction and that the position of the rib 14' is not distant from the inner surface of the peripheral wall 12a. In other points, the third embodiment has the same construction as that of the first embodiment. Thus the same parts of the third embodiment as those of the first embodiment are denoted by the same reference numerals as those of the first embodiment, and description thereof is omitted herein.

In the third embodiment, by mounting the upper cover 12 on the case body 11, a peripheral wall 13b of the lower cover 13 is fitted into the gap between the peripheral wall 12a and the rib 14' both forming the double-wall construction. There by a waterproof wall is formed. Inside the watertight region not surrounded with the rib 14', the watertight bent portion 27 formed on the inputs ide bus bar 21 and the watertight bent portion 28 formed on the output-side bus bar 23 are disposed. The rib 14 and the watertight bent portions 27, 28 surround the watertight region. In this construction, the rib 14' and the watertight bent portions 27, 28 surround the four sides of the watertight region, thus waterproofing the watertight region. Further unlike the construction in which a square rib is formed, this construction eliminates the need for forming a space corresponding to one side of a square, thus contributing to miniaturization of the electric junction box.

What is claimed is:

1. An electric junction box comprising:
a case body which accommodates a bus bar and has a fuse connected with said bus bar in said case body,
an upper cover and a lower cover, with said upper cover and said lower cover mounted on upper and lower surfaces of said case body respectively,
wherein an entire peripheral wall of said upper cover is not constructed as a double-wall construction, but is locked to a peripheral wall of said lower cover or a peripheral wall of said case body, and
in a watertight region including at least said fuse, a rib is projected in the shape of a frame from an inner surface of an upper wall of said upper cover to surround said watertight region.

2. An electric junction box according to claim 1, composed of a fuse box mounted on a battery box, wherein said fuse comprises a fusible link; a region in which said fusible link or a plurality of fusible links arranged adjacently is disposed is formed as said watertight region; and said bus bar connected with an input terminal of said fusible link is connected with a battery terminal.

3. An electric junction box according to claim 2, wherein a bolt is projected from a portion where said bus bar and said fusible link are connected with each other and is spaced at a predetermined interval from a bottom wall of said case body; said bolt is inserted into input and output terminals of said fusible link to fix said fusible link with a nut; said fusible link is spaced at a predetermined interval from said bottom wall of said case body; and a drain hole is penetrates through said bottom wall of said case body at which a lower portion of said fusible link is disposed.

4. An electric junction box comprising:
a case body which accommodates a bus bar and has a fuse connected with said bus bar in said case body,
an upper cover and a lower cover, with said upper cover and said lower cover mounted on upper and lower surfaces of said case body respectively,
wherein a rib is projected from an inner surface of an upper wall of said upper cover by disposing said rib at a side of a fuse-including watertight region confronting a peripheral wall of said upper cover;
said lower cover or a peripheral wall of said case body is fitted in a space between said rib and said peripheral wall of said upper cover to form a waterproof wall; and
inside a portion of said upper cover in which said waterproof wall is not formed, a watertight bent portion is formed on said bus bar connected with said fuse so that said watertight region is surrounded with said watertight bent portion and said waterproof wall.

5. An electric junction box according to claim 4, composed of a fuse box mounted on a battery box, wherein said fuse comprises a fusible link; a region in which said fusible link or a plurality of fusible links arranged adjacently is disposed is formed as said watertight region; and said bus bar connected with an input terminal of said fusible link is connected with a battery terminal.

* * * * *